United States Patent [19]

Pierson, Jr.

[11] 4,308,140

[45] Dec. 29, 1981

[54] SEA CLEANING AND OIL RECOVERY VESSEL TERMED "SCOR-VESSEL"

[76] Inventor: Harry G. Pierson, Jr., 109 Spring St., West Bridgewater, Mass. 02379

[21] Appl. No.: 38,743

[22] Filed: May 14, 1979

Related U.S. Application Data

[63] Continuation of Ser. No. 800,229, Jun. 9, 1977, abandoned.

[51] Int. Cl.³ ............................................. B01D 17/02
[52] U.S. Cl. ................................. 210/242.3; 210/923
[58] Field of Search .................. 210/73, 83, 119, 121, 210/262, 242, 521, 522, 532, 540, DIG. 25, 923

[56] References Cited

U.S. PATENT DOCUMENTS

| | | | |
|---|---|---|---|
| 3,844,944 | 10/1974 | Mercuri | 210/73 |
| 3,957,646 | 5/1976 | Wickert | 210/242 S |
| 3,980,559 | 9/1976 | Netzell | 210/242 S |
| 4,033,876 | 7/1977 | Cocjin et al. | 210/242 S |
| 4,119,541 | 10/1978 | Makaya | 210/DIG. 25 |

Primary Examiner—Kenneth M. Schor
Assistant Examiner—F. H. Lander
Attorney, Agent, or Firm—Cesari & McKenna

[57] ABSTRACT

The invention as described in this application is the culmination of my work in response to a current need to recover oil, resulting from the multiple oil spills occuring on the seas and harbors, rivers and lakes, in the United States. The irreversible damage to fish and wildlife is widely evident and the cost to mankind is immeasureable. Therefore, I have applied tried and proven known principles and technology, to invent a new process to recover contaminating liquids from the surface of waters used for marine navigation and transportation by ingesting and storing those liquids in a tanker type vessel.

8 Claims, 4 Drawing Figures

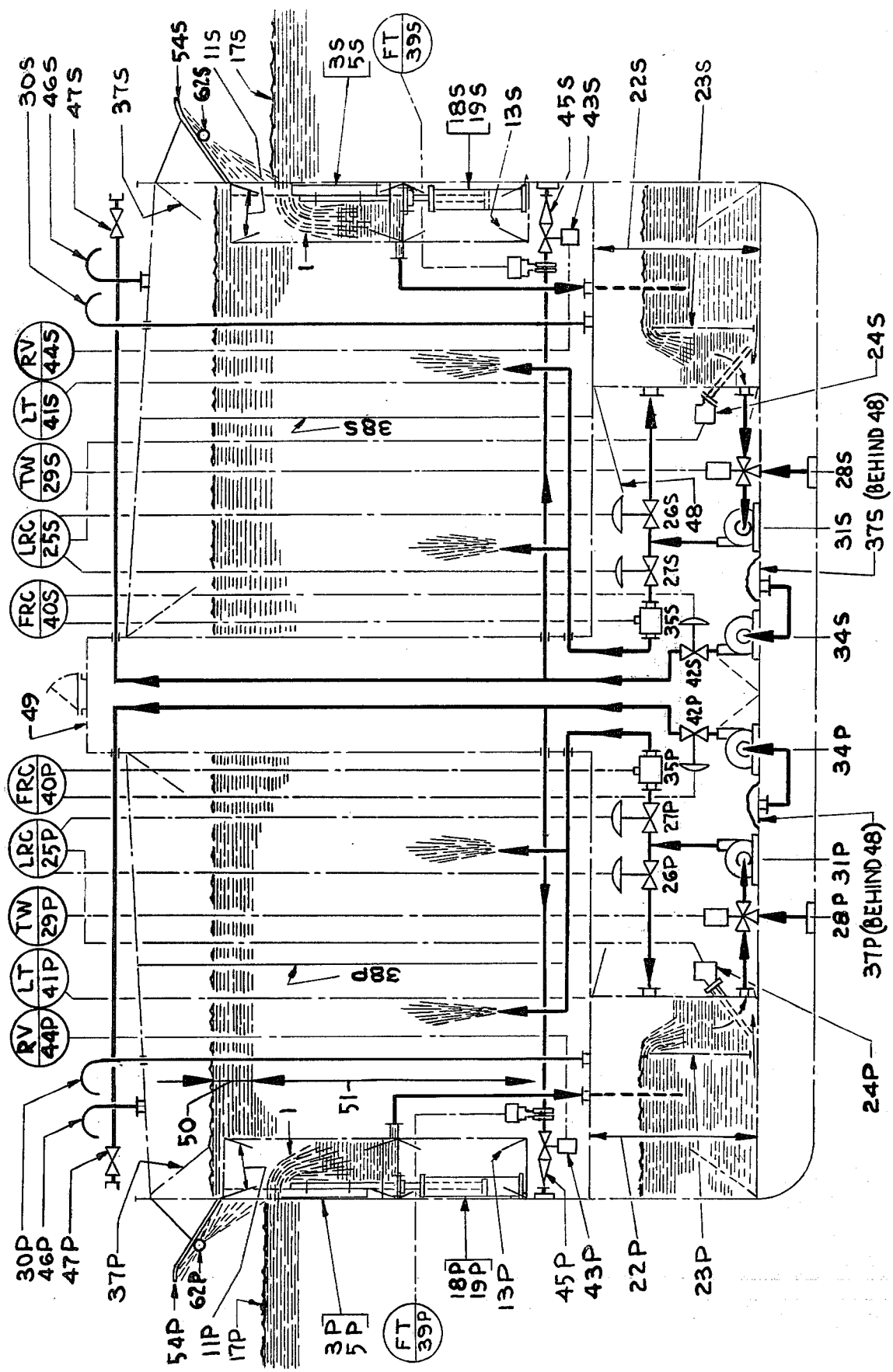
FIGURE NO. 1

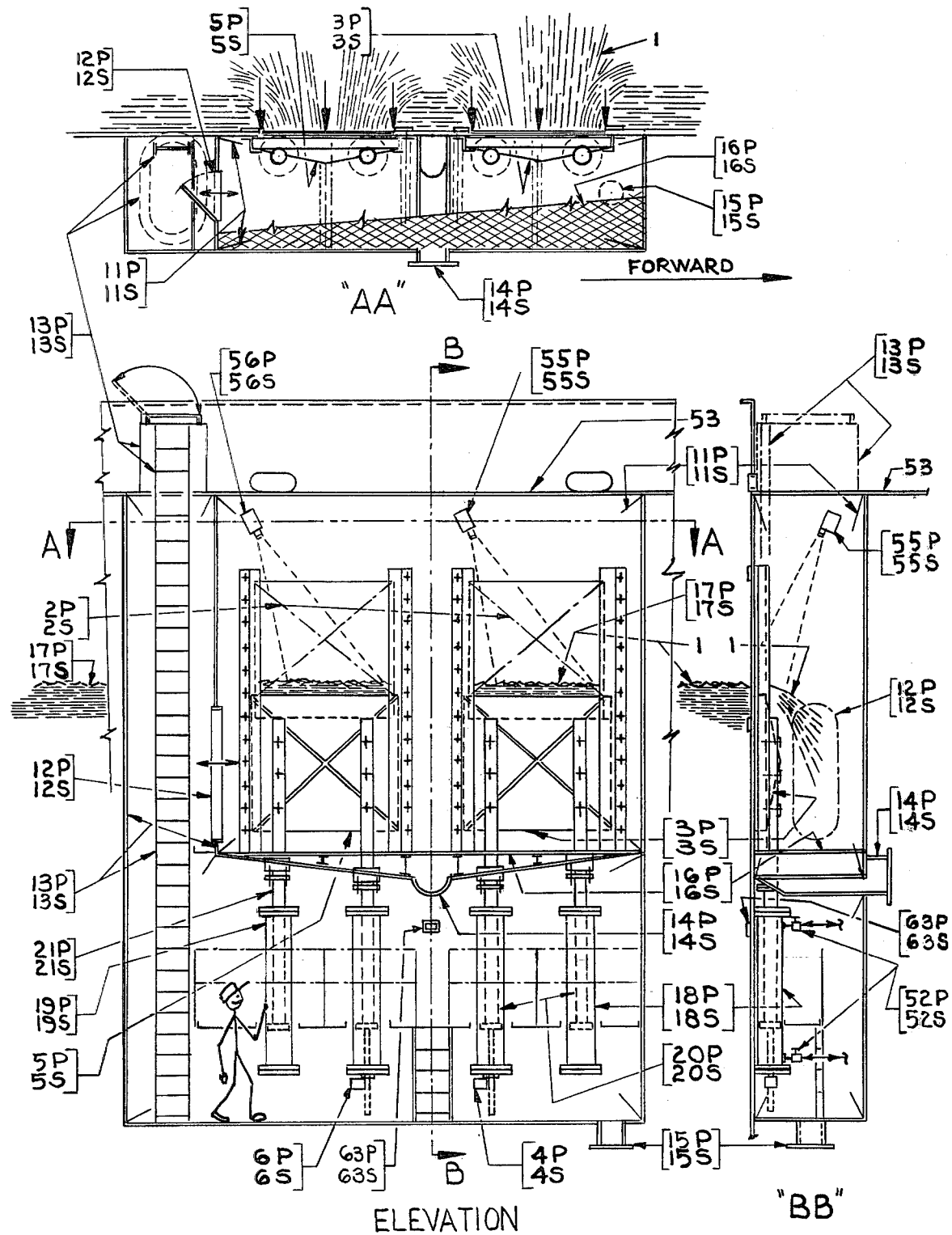
FIGURE NO. 2

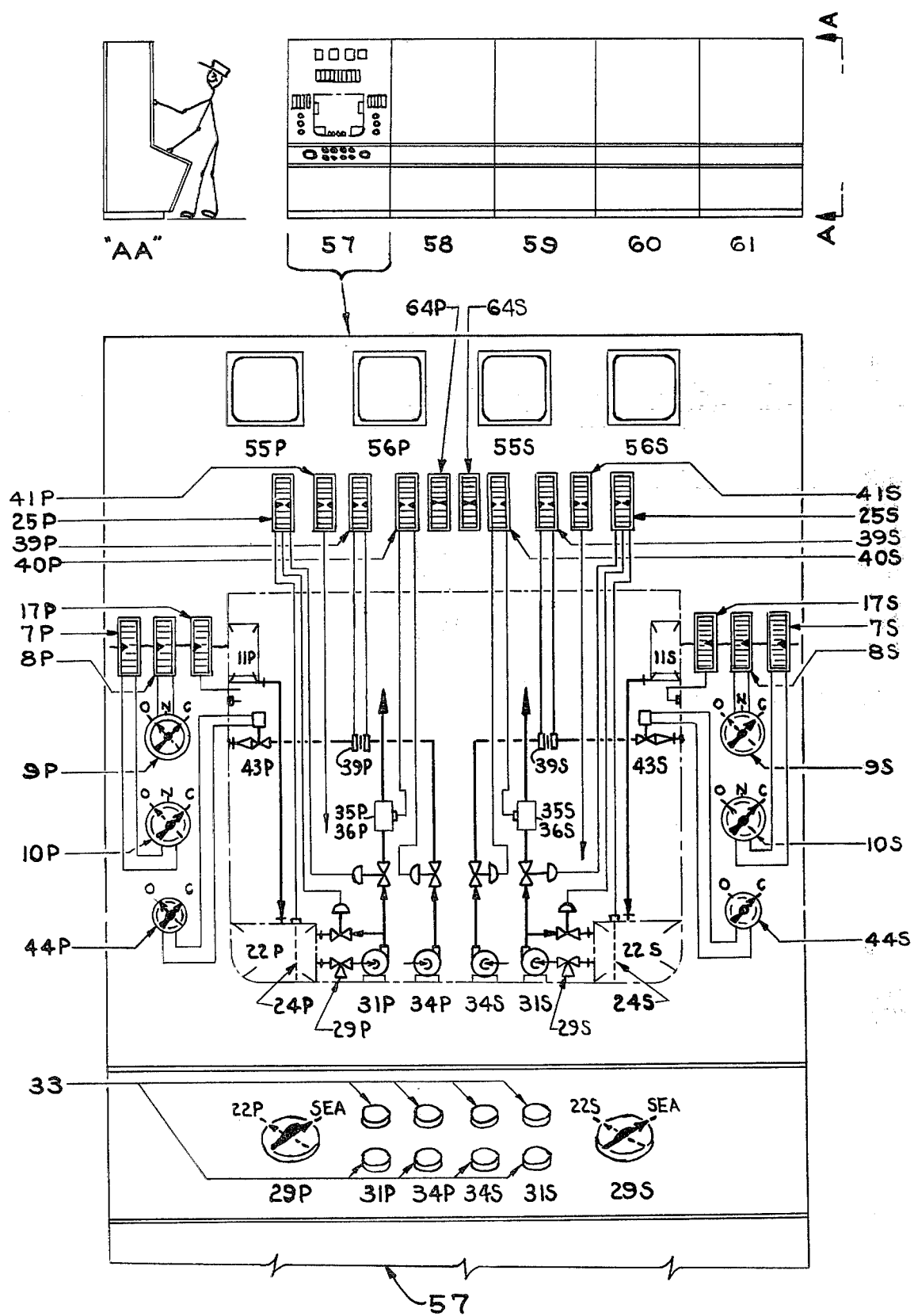
FIGURE NO. 3

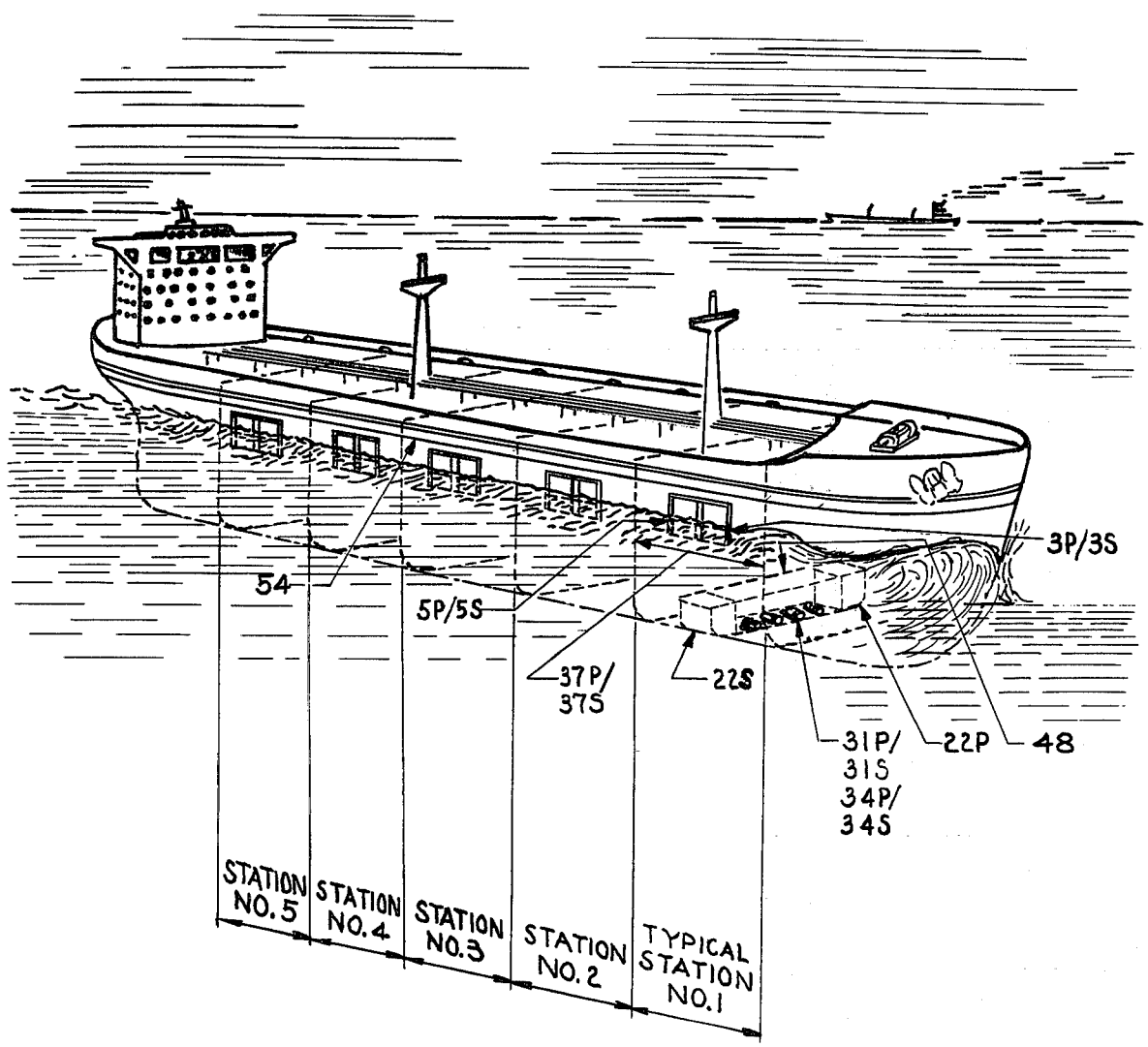
FIGURE NO. 4

SEA CLEANING AND OIL RECOVERY VESSEL TERMED "SCOR-VESSEL"

This is a continuation of application Ser. No. 800,229 filed June 9, 1977, and now abandoned.

The usefulness of the invention is not limited to oil recovery but can be implemented to recover such materials as floating sludge, liquid wastes, chemicals or debri, according to the need. Also, the invention has definite military significance where oil spills could occur as a premeditated harassment against our government, our ecology effort and our economy, or more directly, contaminating our waters with deleterious floating chemicals. My invention will provide for ingestion of water and oil or contaminating materials through several large sea chests and vertically operating gate valves on a vessel's hull, located at the Load Water Line, to Collection Tanks, Pumps and Main Storage Tanks. The principle of water and oil or other material ingestion is based upon flowing large volumes of water, as a conveying medium over the sea chest gate valves, as water flowing over a dam, in order to capture the floating oil/material on the surface of the water.

The ratio of floating oil/material to the water will vary according to the viscosity of the oil or the density of the material to be recovered. This ratio has been assumed as a hypothetical model, to be 10 parts of oil/material, 10%, to 90 parts of water, 90%, by weight, for this invention.

A constant vessel displacement is an absolute requirement for this invention, to continually maintain the sea chest and gate valve elevation at the vessel's Load Water Line. This is effected by discharging overboard, clean sea water or fresh water previously stored in the vessel's tanks as ballast and simultaneously ingesting contaminating oil/material and water, constantly maintaining a weight balance between the two independent flows during the exchange. The recovery operation will continue until there is a complete exchange of the on-loading oil/material and water for the discharged clean water ballast.

A continued exchange of the two flows can take place within certain limitations, because of the separation by gravity settling of the conveying water and agglomeration of the oil/material near and at the top of the Vessel's Main Storage Tanks. As the ingested flow of water and oil/material is discharged upward at the bottom of the Main Storage Tanks, the accumulating oil/material, being of a lesser specific gravity than water, will rise and build a floating pad by agglomeration, on the top of the water. Oil based products such as bunker "C" oil, diesel oil, kerosene, heating oil and gasoline have a specific gravity in the range of 0.70 to 0.90. Fresh water and sea water have a specific gravity of 1.0 and 1.2 respectively. Clean settled water will be withdrawn from the bottom of the Vessel's Main Storage Tanks until the oil/material pad has deepened and occupies the major portion of the tanks and a twilight zone of mixed oil/material and water has been determined by sampling the overboard discharge. At this time the clean settled water has been completely pumped overboard and the vessel is considered to be fully loaded with recovered oil or material.

The recovery operation has been effected by moving large quantities of water as a conveying medium, by gravity flow and centrifugal pumps and controlled by conventional instrumentation.

The vessel or vessels so equipped, can operate unencumbered through the contaminated area, independent of any other supporting facilities, ingesting oil/material and water, until the recovery operation is terminated or the vessel is completely filled.

SUMMARY OF THE INVENTION

Therefore, the important object of this invention is to ingest oil or material that has been spilled, dumped or otherwise voluntarily or involuntarily released to the surface of waterways, into a tanker type vessel or ship, in order to recover oil or other floating materials for the purpose of cleaning the waterways used for marine navigation, transportation and fishing. This process will render those waterways safe for the existence of marine and wild life and help restore equilibrium to ecological systems, national economy and our human habitat.

A further important object of this invention is to provide for the ingestion of oil or material and conveying water, by gravity flow over the top horizontal edge of a cylinder powered, fiat face, square or rectangular, vertically operated gate valve, the valves being installed as an integral part of a sea chest that is mounted inside of the vessel's hull. The gravity flow over the top of the gate valve shall be similar to water flowing over a dam.

A further important object of this invention is an enclosure referred to as a Sea Chest and the Sea Chest related equipment and components. The Sea Chest shall form a watertight compartment directly below the vessel's Main Deck, for housing the gate valves, and the gate valve power cylinders and allow accumulation of the oil/material and water, flowing over the top edge of the gate valves. The Sea Chest will be sized to accomodate two gate valves, for this description, however, the same design shall be applied to a single gate valve and a single sea chest or multiple valves, two or more, in one large sea chest. The approximate midpoint of the vertical dimension of the sea chest will be located at the vessel's Load Water Line thereby allowing adequate space for vertical operating adjustment of the top horizontal edge of the gate valve. The operating space for the valve travel above the load water line, shall allow various settings of the valves top horizontal inlet edge, in accordance with the nature of the water surface in which the vessel is operating. Moderate or calm water surface will dictate a lower elevation of the top edge of the gate valve with constant gravity flow. A moderate or rough water surface will dictate a higher elevation of the top edge of the gate valve due to massive water surges. The Sea Chest and water tight compartment below, shall be accessible by means of a vertical passage and ladder and watertight door, from the main deck of the vessel, for maintenance and cleaning. The watertight compartment shall be located directly below the sea chest for housing the hydraulically oil or air operated power cylinders and cylinder rods. The cylinders are used for lowering and raising the gate valves. Stuffing boxes with ring packing shall be used for sealing between the water side of the sea chest and the dry side adjacent to the cylinders. The inside bottom of the sea chest shall be fitted with a stainless steel or Monel metal perforated Debri Strainer Plate for the purpose of protecting the piping and pumps in the system. The bottom of the sea chest shall be fitted with a pipe nozzle outlet to conduct the oil/material and conveying water away from the sea chest. The watertight compartment for the power cylinders housing and maintenance shall be fitted with a low point drain nozzle. One power cylinder for each gate shall be fitted with a gate position actuator rod projecting downward from the bottom side of the piston and through the bottom of the cylinder and gland. The rod shall actuate a gate valve position transmitter that shall transmit an electronic signal to a gate valve position indicator located at the Process Control Console, on the vessel's bridge. Each Sea Chest Gate Valve shall be equipped with a television camera located above the valve, for transmitting ingestion conditions to a monitor located at the Process Control Console on the vessel's bridge. Each television camera shall be fitted with remote control purge water at the lens, to clean away salt spray, splashing, etc., resulting from ingestion operations.

A further important object of this invention is the utilization of Collection Tanks, Collection Tank pumps and Collection Tank related equipment and components. One tank and one pump to be located on the port side and one tank and pump to be located on the starboard side, at the bottom of the vessel. The Collection Tanks shall temporarily store ingested oil/material and water that has gravitated from the sea chests. The tank storage shall serve as a system reference point for the process flow, where tank level control and magnetic flowmeter measurement of the flow out of the tank, directly relate to the rate of ingestion and shall be implemented for automatic control of the rate of flow of the clean ballast water discharge overboard. The pumps for pumping oil/material and water from the Collection Tanks to the Main Storage Tank will be sized for the rate of flow in gallons per minute, based upon the range of ingestion in gallons per minute, according to the vessel design. The pump discharges will be controlled by level sensors and transmitters located at the Collection Tanks and a level controller modulating two control valves. The control valves located in the Collection Tank pump discharge piping will automatically establish constant level in the Collection Tanks, continuous flow to the Main Storage Tanks and controlled filling of the Collection and Main Storage Tanks with clean ballast water, at the beginning of the recovery operation. The Collection Tanks shall be protected by vent piping which shall terminate at the vessel's main deck. The tanks will also contain one internal baffle which will assist preliminary separation of oil/material and water and reduce excessive movement of the liquid within the tank, due to the vessel's motion.

A further important objective of this invention is the utilization of Main Storage Tanks, Main Storage Tank pumps, and Main Storage Tank related equipment and components. One tank and one pump shall be located on the port side of the vessel and one tank and one pump shall be located on the starboard side. The Main Storage Tanks are integral with and form the principal structure of the vessel. The tank shall contain internal vertical baffles to assist in separation of the oil/material and water and reduce excessive movement of the liquid within the tanks due to the vessel's motion. The Main Storage Tanks shall be the termination point for the ingested oil/material and water pumped from the Collection Tanks. Termination of the flow shall be at multiple vertical headers located in the lower part of the Main Storage Tanks. Flow is directed upward, assisting the natural ascent of oil in water, promoting agglomeration and separation of oil/material and water. The oil/material will form a pad on the surface of the water at the top of the Main Storage Tank and continually build downward, thickening and deepening as the cleaning operation progresses. The resident time for additional separation and settling shall be determined by the Main Storage Tanks size which is directly related to the particular vessel design. The resident time is also dependent on the rate of ingestion, which in turn, determines the rate of flow of the overboard discharge of clean ballast water. The clean ballast water will be pumped from the Main Storage Tanks by pumps sized for the rate of flow based upon the range of ingestion for the vessel design. The pumps discharges shall be controlled by control valves, receiving the input control signal from the magnetic flow meters, and flow transmitters located at the Collection Tanks pumps discharge piping. The clean ballast water shall be directed overboard substantially below the water's surface. The pump discharges shall also be equipped with orifice flanges and an orifice plate for flow measurement in gallons per minute of the clean ballast water discharged overboard. The flow measurement shall be transmitted to a flow indicator at the Process Control Console on the vessel's bridge by a flow transmitter, for indicating overboard discharge flow in gallons per minute. The flow measurement shall be used as a monitoring and calibration check for adjusting the flow control in gallons per minute of the Main Storage Tank Pumps in conjunction with the magnetic flow meters. The flow measurement will assure a one to one ration by weight of onloading ingested oil/material and water -vs- clean ballast water discharged overboard. The Main Storage Tanks shall be equipped with conductivity type multilevel probes which shall determine the depth of the oil pad, the depth of the clean water ballast and the interface between the two, simultaneously, with a dual readout. The tanks will also be vented by piping vents terminating at the vessel's main deck.

A further important objective of this invention is an area at the bottom of the vessel, adjacent to and under the main storage tanks, for housing the collection tanks, port and starboard, the collection tank pumps, port and starboard and the main storage tank pumps, port and starboard, designated as the Cargo Pump Room, and shall be numbered according to the vessel's size. For this invention a hypothetical case shall include five Cargo Pump Rooms and each pump room shall contain two units designated as one port unit and one starboard unit. One unit shall include one sea chest with two gate valves, one Collection Tank, one Collection Tank Pump and one Main Storage Tank Pump. The Carbon Pump Room shall have access from the vessel's main deck by a main deck hatch and vertical passage and ladder. The vertical passage shall be adaquately sized to accomodate man access, the piping for the collection tank pumps discharge to the main storage tanks and the piping for cargo unloading and clean ballast water overboard discharge.

A further important objective of this invention is the inclusion of a Process Control Center with a Process Control Console for each of the five hypothetical model Cargo Pump Rooms. The Process Control Center shall be located on the vessel's bridge, enabling recovery procedures to be coordinated with the navigation of the vessel and the nature of the seas or waters in which the recovery operation is being conducted. Each console shall contain a graphic process control panel with indicating lights, a television receiver for monitoring each gate valve, controls for operating the gate valves downward, neutral and upward, positioning the Collection Tank pump suction three way valves and starting and stopping the Collection and Main Storage Tank pumps. The consoles will also contain the instruments for indicating the position of the gate valves, the vessel's load water line at each sea chest, the levels of the collection and main storage tanks and the rate of flow in gallons per minute of ingested oil/material through the magnetic flow meters. The water temperature in which the recovery operation is being conducted shall be recorded on a strip recording chart at one control console. Also, an electric clock shall be located on one console for recording time of recovery operations.

A further important objective of this invention is the utilization of a reinforced continuous horizontal deflection baffle, installed at a 45° angle projection at the outside of the ship's hull on the port and starboard sides and along the entire vessel's length. The baffle will be located at some point above the vessel's load water line to deflect oil/material and water mixture away from the vessel, reducing spray and splashing onto the main deck. The baffle shall be cambered to deflect wave action away from the ship, much the same as the shape of the bow section of certain vessels. A steam cleaning manifold fitted with steam nozzles, equally spaced on centers, shall be attached to the underside of the baffle and be continuous the full length of the port and starboard sides of the vessel. The steam cleaning shall be used for purging the ship's hull of oil after leaving contaminated waters.

DRAWINGS

FIG. No. 1 indicates the Pierson Process flow in diagrammatic form.

FIG. No. 2 indicates the mechanical arrangement of the Sea Chest, Gate Valves, Gate Valve Cylinders and the Sea Chest and Cylinder access area.

FIG. No. 3 indicates the detailed arrangement of one Process Control Console for one station and a composite view of a hypothetical design model, vessel, which includes five Process Control Consoles for five stations.

FIG. No. 4 is a perspective of a Sea Cleaning and Oil Recovery Vessel of hypothetical design model, showing five Sea Chests on the starboard side. Five similar Sea Chests would also be on the port side.

NOMENCLATURE

A nomenclature of all of the numbered equipment and components is included in the application and follows the Design Data at the end of the description.

DESCRIPTION

A new or converted vessel or tanker equipped for oil recovery, will proceed to an oil spill area ballasted lightly with sea or fresh water so as to maintain maximum speed. When the vessel has arrived close to the oil spill area it will load on additional sea/fresh ballast water, filling and trimming all of the Collection and Main Storage Tanks, so that the displacement draft of the ship will place the midpoint elevation of the port and starboard sea chest gate valves at the surface of the sea. The sea chests and gate valves are now properly related to the water surface for ingesting the oil/material and water.

The ballast filling procedure is described with nomenclature applied for cargo pump room, No. 48, with two units, one port unit and one starboard. The filling procedure is accomplished by positioned three way valves, No. 28P and 28S remote operated by 29P and 29S Selector Switches on the Process Control Console, so that sea water is directed from the sea/fresh water inlet to the pump suction of pumps No. 31P and 31S. The three way valves, pumps and selector switches are shown in FIG. No. 1 and FIG. No. 3. The pump discharges will be directed to the Collection Tanks No. 22P and No. 22S, FIG. No. 1, by application of control valves No. 26P and No. 26S and Level Recorder Controllers No. 25P and No. 25S, FIGS. No. 1 and No. 3, from the Process Control Console, located on the ship's bridge. Position the three way valves as directed above and start pumps No. 31P and 31S. The collection tanks are now being filled. (All instrumentation, control valves, remote operated three way valves, sea chest gate valves and pumps shall have remote operating stations in the Process Control Console. The stations shall be designed in conjunction with a process flow graphic panel with indicating lights as required). When the collection tanks are filled to a predetermined level, control valves No. 26P and No. 26S will gradually close and control valves No. 27P and 27S will gradually open, admitting water to the main storage tanks No. 37P and 37S. The control valve operation is governed by a 3–15 P.S.I. Split range air signal. Control valves No. 26P and No. 26S will be reverse acting and will be full open on a 3 LB. air signal and closed on a 12 LB. air signal. Control Valves No. 27P and No. 27S will be closed on a 6 LB. air signal and full open on a 15 LB. air signal. This mode of operation will provide wide flexibility when filling the Collection and Main Storage Tanks and also during the recovery operation. The system will simply go on a recycle at the collection tanks when the sea chest gate valves No. 3P, 3S, 5P and 5S are closed with no discharge to the Main Storage Tanks. When the gate valves are opened, the level will rise in the Collection Tanks, Control valves No. 26P and No. 26S will close and Control Valves No. 27P and No. 27S will open. When the collection tanks No. 22P and No. 22S are completely filled, ballast water will be directed to the Main Storage Tanks No. 37P and No. 37S in accordance with the above mode of operation, with Control Valves No. 27P and No. 27S wide open and Control Valves No. 26P and No. 26S closed. When the Main Storage Tanks are filled and the vessel trimmed to the proper displacement, switch over three way valve No. 28P and No. 28S from sea suctions to Collection Tank No. 22P and No. 22S suction. The collection tank levels will go down and automatically Control Valve No. 27P and No. 27S will close and Control Valves No. 26P and No. 26S will open to satisfy the lowering collection tanks levels.

The Main Storage Tanks No. 37P and 37S and the Collection Tanks No. 22P and No. 22S are filled and trimmed, so that the ship is positioned fore and aft and athwart ships for the ultimate relationship of the midpoint elevation of the sea chest gate valves No. 3P, 3S, 5P and 5S, to the ship's water line. The gate valves, No. 3P, 3S, 5P and 5S, two in each sea chest, can now be lowered to an elevation approximately 3″ to 6″ below the ship's water line and the operation for oil/material and water ingestion can begin.

The oil/material and water from the sea will flow by gravity over the top of the 6′0″ wide gate valves No. 3P, 3S, 5P and 5S into the sea chest compartment No. 11P and 11S, FIGS. No. 1 and 2. The gate valves will form a water tight seal on two sides and the bottom during operation and a watertight seal on all four sides when closed. The gate valves will be lowered and raised by hydraulic oil operated cylinders, No. 18P, 18S, 19P and 19S, two cylinders for each valve. Manually set speed control valves No. 52P and 52S, FIG. 2, "BB", will be installed in the two hydraulic oil lines serving each cylinder, to govern the flow of oil and the operating speed of the cylinder and therefore the rate of opening or closure of the gate valves.

The oil/material and water will flow by gravity from the sea chest compartment, through piping, to the collection tanks No. 22P and No. 22S below. Two gate valves, one sea chest and one collection tank shall be termed a collection unit. For this description a hypothetical flow of 2226 G.P.M. (gallons per minute) of oil/material and water will flow through one collection unit, or 1113 G.P.M. flow (3" deep) over the top of each gate valve. This is based on Francis Formula for water flow over a rectangular weir. (2) The oil/material and water will accumulate on top of the previously stored ballast water in the collection tank and rise to a predetermined level which will be sensed by the level transmitters No. 24P and No. 24S. The level transmitter signals will activate level controllers, No. 25P and No. 25S, opening and throttling level control valves No. 27P and No. 27S discharging through piping and Magnetic Flow Meters No. 35P and No. 35S to the lower area of the port and starboard Main Storage Tanks. Magnetic Flow Meters, No. 35P and 35S will measure the flow rate of the collection tank pump discharges with the resulting signal transmitted as input to Flow Recorder Controllers No. 40P and No. 40S, for modulating control valves No. 42P and No. 42S in the discharge piping of Main Storage Tank pumps No. 34P and 34S.

Immediately after the Collection Tank pumps No. 31P and 31S have been started, the Main Storage Tank pumps No. 34P and 34S will be started. With Selector Switches No. 44P and 44S, FIG. 3, simultaneously open remote operated valves No. 43P and 43S for discharge overboard of clean ballast water from the low point of the Main Storage Tanks No. 37P and No. 37S.

(2) Reference Francis FLow Formula—Cameron Hydraulic Data—Page 69 The remote operating Selector Switches No. 44P and 44S for the remote operated valves will be located on the Process Control Console, FIG. No. 3, on the vessel's bridge. Check Valves No. 45P and 45S are included in the process directly mounted on the overboard discharge sea chest, to allow maintenance on the control valves and main storage tank pumps discharge piping.

The system is now operating completely on the recovery cycle. The collected oil/material and water is being pumped by pumps No. 31P and 31S from the Collection Tanks No. 22P and 22S to the lower area of the Main Storage Tanks, No. 37P and 37S. Simultaneously, clean water is being pumped by pumps No. 34P and 34S from the bottom of the Main Storage Tanks, overboard, to maintain a constant displacement of the vessel.

As described previously, the magnetic flow meters No. 35P and No. 35S will measure the flow rate of the oil/material and water being pumped from the Collection Tanks. Flow Transmitters No. 36P and 36S will transmit this signal to No. 40P and 40S for control of control valves No. 42P and 42S. Thereby, on a nearly one to one ratio, the off loading clean ballast water will be equal in weight to the on-loading oil/material and water. A small correction must ba made on calibration of the flow measurement device No's. 35P and 35S for the difference in specific gravity of the oil/material and water and the clean ballast water in storage. The correction will cause slightly less clean ballast water, by volume, to be pumped overboard - the flow of off-loading clean ballast water shall be equal, by weight, to the flow of the on-loading oil/material and conveying water.

The flow balance, by weight, of the off-loading clean ballast water and on-loading oil/material and water is required for constant ship displacement and constant elevation of the sea chest gate valves at the ship's water line, for maximum efficiency of the flow of the oil/material and water over the top of the gate valves No. 3P, 3S, 5P and 5S.

An assumption has been made that the on-loading oil/material and water will be nine parts, 90%, water and one part, 10%, oil/material. This ratio will vary. However, as the oil/material and some water occupy the top area of the Main Storage Tanks, settling of the water will take place and an oil/material pad will begin to form by agglomeration. Continuous withdrawal of the clean ballast water below the oil/material pad, combined with continuous settling of water from the ingested on-loading oil/material and water, provides the basis for a continuous sea cleaning process. With reference to oil recovery, theoretically, a tanker load of 8,000,000 gallons of spilled oil could be reclaimed in approximately 3.6 days, (1), assuming 90% water and 10% oil and 100% separation efficiency of water and oil. However, the separation efficiency, realistically, would be considerable less than 100% and the reclaim time would be contingent upon many variable factors—i.e. condition of the seas, temperature, type of oil spilled, etc.

(1) Reference Design Data Page

Control of the rate of flow of the on-loading oil/material and water would be dictated by the "set position" of the vertical gate valves No. 3P, 3S and 5P and 5S at the sea chests at the vessel's water line. As stated above, the control valves No. 26P and 26S and No. 27P and 27S will automatically control the level of the ingested oil/material and water in the Collection Tanks, No. 22P and 22S. If more or less oil/material and water enter the Sea Chests and hence the Collection Tanks, the level sensing device will sense the rise or fall of the Collection Tank levels. The level signal, transmitted by No. 24P and 24S to Level Recorder Controller No. 25P and 25S, automatically modulates control valves No. 26P and 26S and No. 27P and 27S located in the Collection Tank pumps discharge piping. The continuous modulation of the control valves will maintain constant Collection Tank level and therefore will provide void space in the upper area of the Collection Tanks for the continuously gravitating oil/material and water from the Sea Chests and proper functioning of the Collection Tank Baffle, No. 23P and 23S. The void area also assures maximum efficiency of the gravity flow.

The Main Storage Tank pumps No. 34P and 34S will discharge the clean ballast water from storage through Control Valve No. 42P and 42S and Remote Operated Valves No. 43P and 43S, to an elevation well below the ship's water line, to minimize disturbance of the oil/material accumulation on the surface of the water. When the Main Storage Tanks are full of recovered oil/material and twilight water, the tanker can proceed to a land based oil terminal for discharging. The same Main Storage Tank pumps No. 34P and 34S will be used to unload the recovered oil/material. By remote operation close valves No. 43P and 43S, FIGS. No. 1 and 3. The manual valves at the hose stations, No. 47P and 47S located on the main deck will be opened as required for transfering the recovered oil/material and twilight water to storage tanks located at the land based reclaim terminal.

The entire system is fail safe due to the piping configuration. If the sea chest gate valves No. 3P, 3S, 5P and 5S were lowered to the full open position by some malfunction, the water would rush in and fill the collection tanks and then flow through the suction and discharge piping of pumps No. 31P and 31S, finally seeking its own sea water level near the top of the Main Storage Tanks. The Main Storage Tanks are confined to piping within the vessel except for the overboard discharges from pumps No. 34P and 34S, which are protected by check valves No. 45P and 45S.

The tanker will be equipped with strongly reinforced continuous horizontal baffles No. 54P and 54S installed at an approximate 45 degree angle projection from the vessel's side and along the entire vessel's length. The baffle will be located just below the gunwhales and its function will be to prevent oil/material and water from splashing above and onto the main deck, as much as possible. A horizontal baffle is shown at FIG. 1, No. 54P and 54S, however, the baffle would be cambered up to deflect the wave action away from the vessel. A steam cleaning pipe, No. 62P and 62S also located along the entire vessel's sides, port and starboard, bow and stern, circumferentially around the ship, will be attached to the under side of the continuous baffle. The pipe will be fitted with steam nozzles, so spaced and arranged so as to direct a diverging spray of live steam against the vessel's hull and the deflector baffle for purging contaminating oil and foam or material, as much as possible from the hull after leaving the contaminated waters.

The invention as stated is for a hypothetical model and includes five stations and two collection units per station. One collection unit equaling 12'0" on the port side and one collection unit equaling 12' on the starboard side or a total of 24'0" of inlet potential per station × 5 stations = 120' of inlet potential over the top of 20-6'0" wide gate valves, shown on FIG. 2. The invention as stated above and in the Design Data, hypothetically, is for operating at a rate of 4452 G.P.M. per station or 2226 G.P.M. per collection unit.

The invention can be applied to sea going vessels or tankers or to smaller vessels for use in harbors or rivers, therefore the number of stations, size of sea chests and valves, configuration of sea chests and valves, will vary according to the tanker or vessel type, size and general design.

The tanker can be propelled by steam, turbo electric, or diesel engines. However, it shall have the means to produce steam for steam cleaning and purging of the vessel's hull after leaving a contaminated area. The vessel's power plant shall have the energy capability for powering motors or steam turbines for driving the recovery process pumps. For this hypothetical design model as described, the pumps would be rated at non-overloading 100 horsepower at 3000 gallons per minute. Therefore, the vessel would require an additional 2000 HP for the sea cleaning operation, utilizing 20 pumps.

DESIGN DATA FOR A HYPOTHETICAL DESIGN MODEL

Average values are used for this invention since strong variations can result from calm, to moderate, to moderately rough seas, during the sea cleaning and recovery operation.

The following recovery date is based on a flow of oil/material and conveying water over a rectangular weir six (6) feet wide, with an average depth of flow over the weir of three (3) inches. One weir, six (6) feet wide is the equivalent of one gate valve in the sea chest. The invention, using a hypothetical model specifies two gate valves per sea chest, which equals one unit.

| | |
|---|---|
| — Flow over one rectangular weir, 6'0" wide × 3" flow depth-average = (The equivalent of one 6'0" wide gate valve in a Sea Chest) | 1113 G.P.M. |
| — Two (2) gate valves 6'0" wide each = 12'0" per sea chest. (2 × 1113) = | 2226 G.P.M. |
| — Five Sea Chests Port Side (5 × 12'0") = 60' | |
| — Five Sea Chests Starboard Side (5 × 12'0") = 60' | |
| — Total Sea Chests and linear feet recovery potential at vessel's waterline — 10 Sea Chests = 120' | |
| — Ten (10) Sea Chests × 2226 G.P.M. Sea Chest | 22260 G.P.M. |
| — Recovery can proceed at the rate of 22260 G.P.M. | |
| — Assume a recovery vessel with a capacity of storage of 8,000,000 gallons of liquid | |
| — Assume a recovery rate of 10% of oil/material, (with 90% conveying water) | |
| — Recovey rate = 10% × 22260 G.P.M. = | 2226 G.P.M. |
| — Recovery rate, gallons/hour 2226 × 60 = | 133,560 G.P.H. |
| — Time of recovery for 8,000,000 gallons — 8,000,000/133,560 = | 59.8 hour |
| — Time of recovery — Days 59.8/24 = | 2.5 days |
| — Apply an efficiency factor for a vessel maneuvering in and around a contaminated area and moderate seas of .70 | |
| — 2.5 days/0.70 = | 3.57 days |

The foregoing calculations are based upon a continuous recovery operation, assuming a complete exchange of clean ballast water for recovery oil/material and conveying water. In addition, recovered operations will continue after the total exchange until a twilight mixture of water and oil/material is determined by sampling the overboard discharge.

Determined of Pump Horsepower

| | |
|---|---|
| — Flow from one collection tank = 2226 G.P.M. | |
| — Increase to 3000 G.P.M. for surges (35%) | |
| — Assume pump discharge head to be 85 feet | |
| — Assume pump efficiency to be 70% | |
| — Horsepower = $\frac{3000 \times 85}{3960 \times .70}$ 91.99 HP | |
| — For non-overloading use 100 HP | 100 HP |

The design data is for a hypothetical model for this invention, to establish parameters for the description. The data shall change according to the specific design of the vessel to which the invention is applied.

NOMENCLATURE
BASED ON STATION NO. 1 OF FIVE
STATIONS, OF A HYPOTHETICAL DESIGN VESSEL

| PORT | | STARBOARD |
|---|---|---|
| 1 | OIL/MATERIAL-CONVEYING WATER | 1 |
| 2P | GATE VALVE OPEN AREA - FORWARD-AFT | 2S |
| 3P | GATE VALVE FORWARD | 3S |
| 4P | TRANSMITTER - FORWARD GATE VALVE POSITION | 4S |
| 5P | GATE VALVE AFT | 5S |
| 6P | TRANSMITTER - AFT GATE VALVE POSITION | 6S |
| 7P | POSITION INDICATOR - GATE VALVE FORWARD | 7S |
| 8P | POSITION INDICATOR - GATE VALVE AFT | 8S |
| 9P | SELECTOR SWITCH - GATE VALVE FORWARD OPEN-NEUTRAL-CLOSE | 9S |
| 10P | SELECTOR SWITCH-GATE VALVE AFT OPEN-NEUTRAL-CLOSE | 10S |
| 11P | SEA CHEST | 11S |
| 12P | ACCESS AND PASSAGE-SEA CHEST | 12S |
| 13P | LADDER-ACCESS AND PASSAGE SEA CHEST AND POWER CYLINDERS | 13S |
| 14P | NOZZLE-SEA CHEST OUTLET | 14S |
| 15P | DRAIN-CYLINDER ACCESS AREA | 15S |
| 16P | DEBRI SCREEN-SEA CHEST | 16S |
| 17P | LOAD WATER LINE-VESSEL | 17S |
| 18P | POWER CYLINDERS-GATE VALVE FORWARD | 18S |
| 19P | POWER CYLINDERS-GATE VALVE AFT | 19S |
| 20P | POWER CYLINDER RODS-FORWARD | 20S |
| 21P | POWER CYLINDER RODS-AFT | 21S |
| 22P | COLLECTION TANK | 22S |
| 23P | BAFFLE-COLLECTION TANK | 23S |
| 24P | LEVEL TRANSMITTER-COLLECTION TANK | 24S |
| 25P | LEVEL RECORDER CONTROLLER COLLECTION TANK | 25S |
| 26P | CONTROL VALVE-COLLECTION TANK RECIRCULATION | 26S |
| 27P | CONTROL VALVE-DISCHARGE TO MAIN STORAGE TANK | 27S |
| 28P | THREE WAY VALVE-AIR OPERATED | 28S |
| 29P | SELECTOR SWITCH-THREE WAY VALVE COLLECTION TANK/SEA | 29S |
| 30P | VENT - COLLECTION TANK | 30S |
| 31P | PUMP - COLLECTION TANK | 31S |
| 32P | | 32S |
| 33 | PUSH BUTTONS START-STOP PUMP MOTORS | 33 |
| 34P | PUMP - MAIN STORAGE TANKS | 34S |
| 35P | MAGNETIC FLOW METER | 35S |
| 36P | TRANSMITTER-FLOW TO MAIN STORAGE | 36S |
| 37P | TANKS-MAIN STORAGE NO. 1 | 37S |
| 38P | BAFFLE-MAIN STORAGE TANK | 38S |
| 39P | TRANSMITTER-FLOW OVERBOARD DISCHARGE | 39S |
| 40P | FLOW RECORDER-CONTROLLER | 40S |
| 41P | MULTI LEVEL INDICATOR NO. 1 MAIN STORAGE TANKS | 41S |
| 42P | CONTROL VALVE-OVERBOARD DISCHARGE | 42S |
| 43P | REMOTE OPERATED VALVE-OVERBOARD DISCHARGE OPEN-CLOSE | 43S |
| 44P | SELECTOR SWITCH-REMOTE OPERATED VALVE-OPEN-CLOSE | 44S |
| 45P | VALVE - LIFT CHECK | 45S |
| 46P | VENT - NO. 1 MAIN STORAGE TANKS | 46S |
| 47P | HOSE VALVE-O/M TO LAND STORAGE TANKS | 47S |
| 48 | CARGO PUMP ROOM NO. 1 | 48 |
| 49 | CARGO PUMP ROOM ACCESS | 49 |
| 50 | OIL/MATERIAL PAD | 50 |
| 51 | CLEAN BALLAST WATER | 51 |
| 52P | SPEED CONTROL VALVE | 52S |
| 53 | MAIN DECK-VESSEL | 53 |
| 54P | DEFLECTOR BAFFLE-VESSEL | 54S |
| 55P | TELEVISION MONITOR-GATE VALVE FORWARD | 55S |
| 56P | TELEVISION MONITOR-GATE VALVE AFT | 56S |
| 57 | PROCESS CONTROL CONSOLE - STATION NO. 1 | 57 |
| 58 | PROCESS CONTORL CONSOLE - STATION NO. 2 | 58 |
| 59 | PROCESS CONTROL CONSOLE - STATION NO. 3 | 59 |
| 60 | PROCESS CONTROL CONSOLE - STATION NO. 4 | 60 |
| 61 | PROCESS CONTROL CONSOLE - STATION NO. 5 | 61 |
| 62P | STEAM CLEANING PIPE | 62S |
| 63P | LOAD WATER LINE TRANSMITTER | 63S |
| 64P | LOAD WATER LINE INDICATOR | 64S |

I claim as my invention:

1. Apparatus for recovering contaminant from a contaminated liquid, comprising

A. a buoyant, self propelled, constant displacement vessel having a continuous closed hull for floatation in the liquid, B. means defining a plurality of horizontally and vertically elongated apertures in side walls of said hull, opening in a direction transverse to the normal direction of motion of said vessel, and positionable at the loaded waterline thereof during collection operations, c. means forming a weir in each said aperture to thereby regulate the rate of ingestion of contaminated liquid in accordance with the size of said openings and essentially independent of the vessel's speed, D. liquid containment means within said hull, including at least one vertically extending main storage tank connected to receive, at a bottom portion thereof, contaminated liquid ingested through said aperture and providing therein gravity separation of said contaminant from said liquid, and E. buoyancy control means in said vessel for maintaining said aperture at said waterline during contaminant recovery operations and including means for discharging liquid from said vessel in an amount proportional to the amount of contaminated liquid loaded thereon, said vessel itself storing all the contaminant collected during a collection operation.

2. Apparatus according to claim 1 in which said weir includes.
A. at least one plate movably mounted in said aperture, and
B. means for moving said plate within said aperture to thereby regulate the aperture opening.

3. Apparatus according to claim 2 in which said plate is mounted for vertical movement in said aperture, an upper edge of said plate defining said weir and over which said contaminated liquid flows.

4. Apparatus according to claim 1 including means connecting a lower portion of said main storage tank to said liquid discharge means for discharging liquid from said tank during contaminant recovery operations.

5. Apparatus according to claim 1 in which said liquid containment means comprises
A. at least one main storage tank integrated with said vessel on each of the port and starboard sides thereof for receiving contaminated liquid therein, and
B. at least one sea chest for each main storage tank for receiving contaminated liquid through said aperture and for supplying said liquid to said tank.

6. Apparatus according to claim 5 which further includes at least one collection tank for each main storage tank, said collection tank receiving contaminated liquid from a corresponding sea chest and transferring it to a corresponding storage tank for contaminant separation and storage.

7. Apparatus according to claim 6 including means responsive to the volume of liquid in said collection tank and the outflow rate of liquid therefrom to establish the rate at which liquid is discharged from said vessel to maintain its buoyancy.

8. Apparatus according to claim 1 including
A. an elongated horizontally extending baffle mounted above said aperture for deflecting spray of contaminated liquid from the upper surface of said vessel, and
B. nozzle cleaning means positioned to discharge a spray on the exterior surface of said baffle to cleanse said baffle of contaminant accumulated thereon during contaminant recovery operations.

* * * * *